(12) United States Patent
Chan et al.

(10) Patent No.: US 8,208,677 B2
(45) Date of Patent: Jun. 26, 2012

(54) SUSPENSION MEMBER FOR SPEAKER

(75) Inventors: Yen-Chen Chan, New Taipei (TW);
Chun-Yi Lin, New Taipei (TW); Jason Theodore Kemmerer, Thousand Oaks, CA (US)

(73) Assignees: Alpine Electronics, Inc., Tokyo (JP); Yen-Chen Chan, Taipei (TW)

( * ) Notice: Subject to any disclaimer, the term of this patent is extended or adjusted under 35 U.S.C. 154(b) by 393 days.

(21) Appl. No.: 12/412,395

(22) Filed: Mar. 27, 2009

(65) Prior Publication Data
US 2009/0180661 A1    Jul. 16, 2009

Related U.S. Application Data

(63) Continuation of application No. 11/163,363, filed on Oct. 17, 2005, now abandoned.

(51) Int. Cl.
*H04R 1/00* (2006.01)
*H04R 7/00* (2006.01)
(52) U.S. Cl. ......................... 381/398; 181/171
(58) Field of Classification Search .................. 381/192, 381/386, 398; 181/170, 171
See application file for complete search history.

(56) References Cited

U.S. PATENT DOCUMENTS
3,154,173 A * 10/1964 Petrie ........................... 181/172

FOREIGN PATENT DOCUMENTS
JP    04249074    *    9/1992
* cited by examiner

*Primary Examiner* — Brian Ensey
(74) *Attorney, Agent, or Firm* — Muramatsu & Associates

(57) ABSTRACT

An elastically deformable suspension member for use in a speaker to establish a sufficient support to a cone is disclosed. The suspension member has an inner diameter portion for mounting the cone, an outer diameter portion spaced around the inner diameter portion for fastening to a basket, a first annular convex surface portion concentrically arranged between the inner diameter portion and the outer diameter portion and constituting a summit, and a number of second annular convex surface portions symmetrically arranged at two opposite lateral sides of the first annular convex surface portion between the inner diameter portion and the outer diameter portion and respectively constituting summit ridges having a height below the summit and above the elevations of the inner diameter portion and the outer diameter portion.

1 Claim, 9 Drawing Sheets

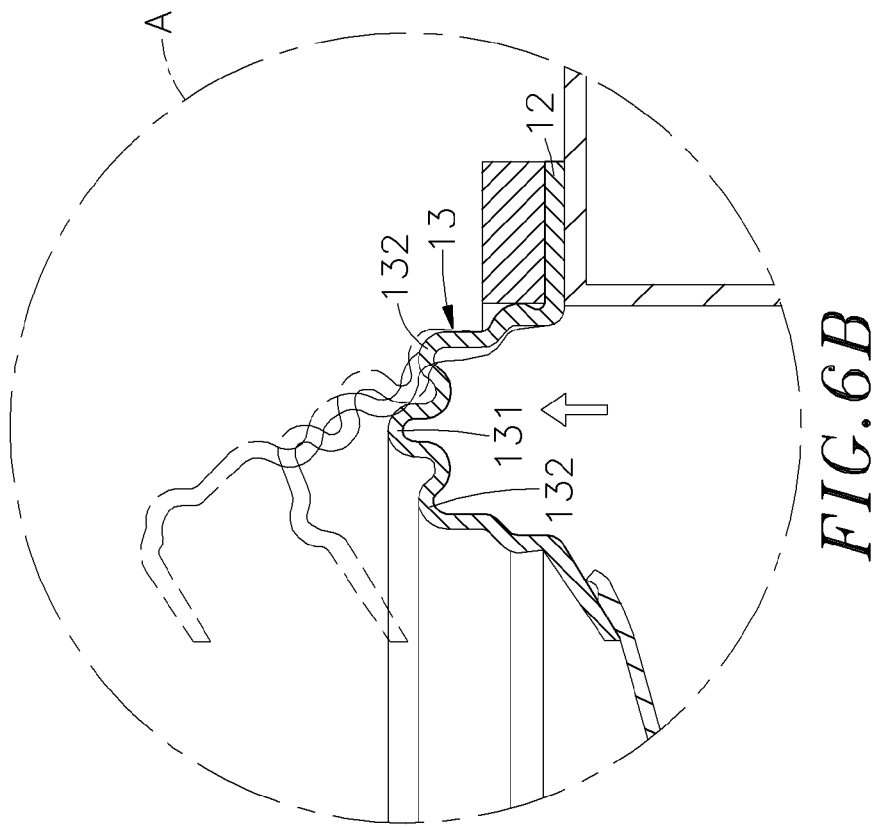
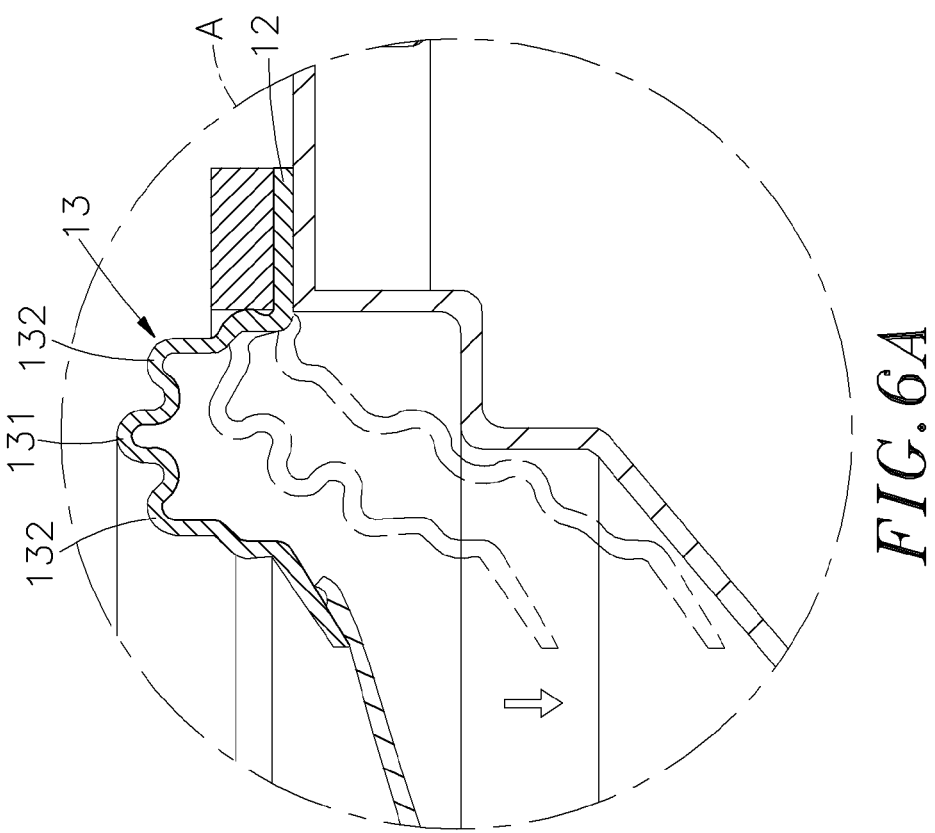

US 8,208,677 B2

SUSPENSION MEMBER FOR SPEAKER

This application is a Continuation-In-Part of my patent application Ser. No. 11/163,363, filed on Oct. 17, 2005.

BACKGROUND OF THE INVENTION

1. Field of the Invention

The present invention relates to a speaker and more particularly, to a suspension member for speaker, which utilizes multiple transversely arched annular convex surface portions to achieve a sufficient support to the cone, while preventing distortion of sound.

2. Description of the Related Art

A speaker is a converter means that converts electric signal into sound signal for output. Many electronic devices such as broadcasting system, stereo system, TV, computer, multimedia system, etc., commonly use speakers for output of sound. A speaker has a voice coil mounted within a magnet. When the voice coil is electrically connected to produce a magnetic induction, the voice coil is caused to move forwards and backwards along an axis when an electric current is supplied thereto, thereby producing a sound wave at a predetermined frequency. Different speakers use different voice coils to produce sound waves at different frequencies. Due to the fast development of technology and change of living style, people are critical to the requirement of the sound quality of a speaker. In addition to the requirement of increasing sound volume, sound quality is an important factor that must be taken into account when selecting a speaker.

A speaker includes some parts, i.e., an outer basket, a suspension member, a cone, and an inner exciter. Every part has a great concern with the performance of the speaker. FIGS. 7, 8 and 8A show the outer appearance of a suspension member and a speaker. As illustrated, the speaker comprises a basket A, an exciter B mounted in a center area within a holding space A1 of the basket A, a cone C suspending around the exciter B, and a suspension member D fastened to a rim of the basket A and connected to a periphery of the cone C to hold the cone C around the exciter B. During operations of the exciter B, the cone C is moved up and down to produce sound. The maximum amount of displacement of the cone C is the stroke of the speaker. The suspension member D is designed to establish a support power to the cone C. The suspension member D is made of an elastic material, having a curved surface portion D1 to fit the motion of the cone C.

However, because the suspension member D has one single curved surface portion D1 extending around the border area, the supporting power of the suspension member D to the cone C is limited. If the stroke of the speaker surpassed the supporting power provided by the suspension member D to the cone C, a distortion of sound will occur. In this case, the user cannot enjoy a high quality of sound. If to extend the size of the curved surface portion D1, the supporting power will be relatively reduced, and the stroke of the cone C will be relatively increased, resulting in distortion of sound. Further, changing the size of the curved surface portion D1 of the suspension member D must relatively change the structure of the basket A and the cone C, thereby increasing the manufacturing cost.

Besides, a loudspeaker system of the prior art is disclosed in which the transducer comprises a chassis, a diaphragm located within the chassis, an electromagnetic actuator, which has a first actuator part connected to the back part of the diaphragm and a second actuator part connected to the chassis to cooperate with the first actuator part via an air gap, a telescoping arrangement coupled between the chassis and the diaphragm, and suspension means for flexibly suspending the diaphragm from the chassis via the telescoping arrangement. This design greatly increases the area of the suspension, thereby lowering the supporting power to support the cone and relatively increasing the stroke of the cone. In order to fit the extended size of the suspension, the basket and the cone must be specially designed.

Further, a transducer suspension of the prior art is disclosed. According to this design, the suspension member is comprised of a dense non-cellular silicone rubber material such that the suspension member operates reliably over an extremely wide temperature range, having an outer edge portion attached to the main body of the transducer, an inner edge portion attached to a diaphragm, and a resilient region extending between the outer and inner edge portion. According to this design, the resilient region is insufficient to support the movement of the cone, and a distortion of sound may be produced during the operation of the speaker system.

Further, a suspension design of the prior art is disclosed. According to this design, the suspension member is a resilient member having multiple curved surface portions. Because the suspension member is formed integral with the cone, the suspension member will oscillate with the cone during the operation of the speaker system, thereby affecting the sound quality of the cone. Further, the stroke of the cone gives an impact to the suspension member, causing the suspension member unable to effectively support the motion of the cone.

Therefore, it is desirable to provide a suspension member that eliminates the aforesaid drawbacks.

SUMMARY OF THE INVENTION

The present invention has been accomplished under the circumstances mentioned above. It is one object of the present invention to provide a suspension member for speaker, which utilizes multiple transversely arched annular convex surface portions to attain a sufficient support to the cone, while preventing the distortion of sound.

To achieve this and other objects of the present invention, a suspension member for speaker has an inner diameter portion for the mounting of a cone, an outer diameter portion for bonding to a basket, and a number of annular convex surface portions radially connected between the inner diameter portion and the outer diameter portion and extending around the inner diameter portion. The annular convex surface portions include a middle one that constitutes a summit. The other annular convex surface portions are symmetrically arranged between the inner diameter portion and the outer diameter portion at two opposite sides relative to the summit and respectively constitute a respective summit ridge that has a height below the summit and above the elevations of the inner diameter portion and the outer diameter portion. Thus, the suspension member shows a substantially Ω-shaped cross section, and provides a sufficient support to the cone.

Further, the number of the annular convex surface portions may be changed without changing the distance between the inner diameter portion and the outer diameter portion, so that suspension members having a different number of annular convex surface portions can be used with one same specification of cone for different speakers.

BRIEF DESCRIPTION OF THE DRAWINGS

FIG. 6A corresponds to FIG. 5, showing the suspension member in action (I).

FIG. 6B corresponds to FIG. 5, showing the suspension member in action (II).

DETAILED DESCRIPTION OF THE PREFERRED EMBODIMENT

Figure 1:
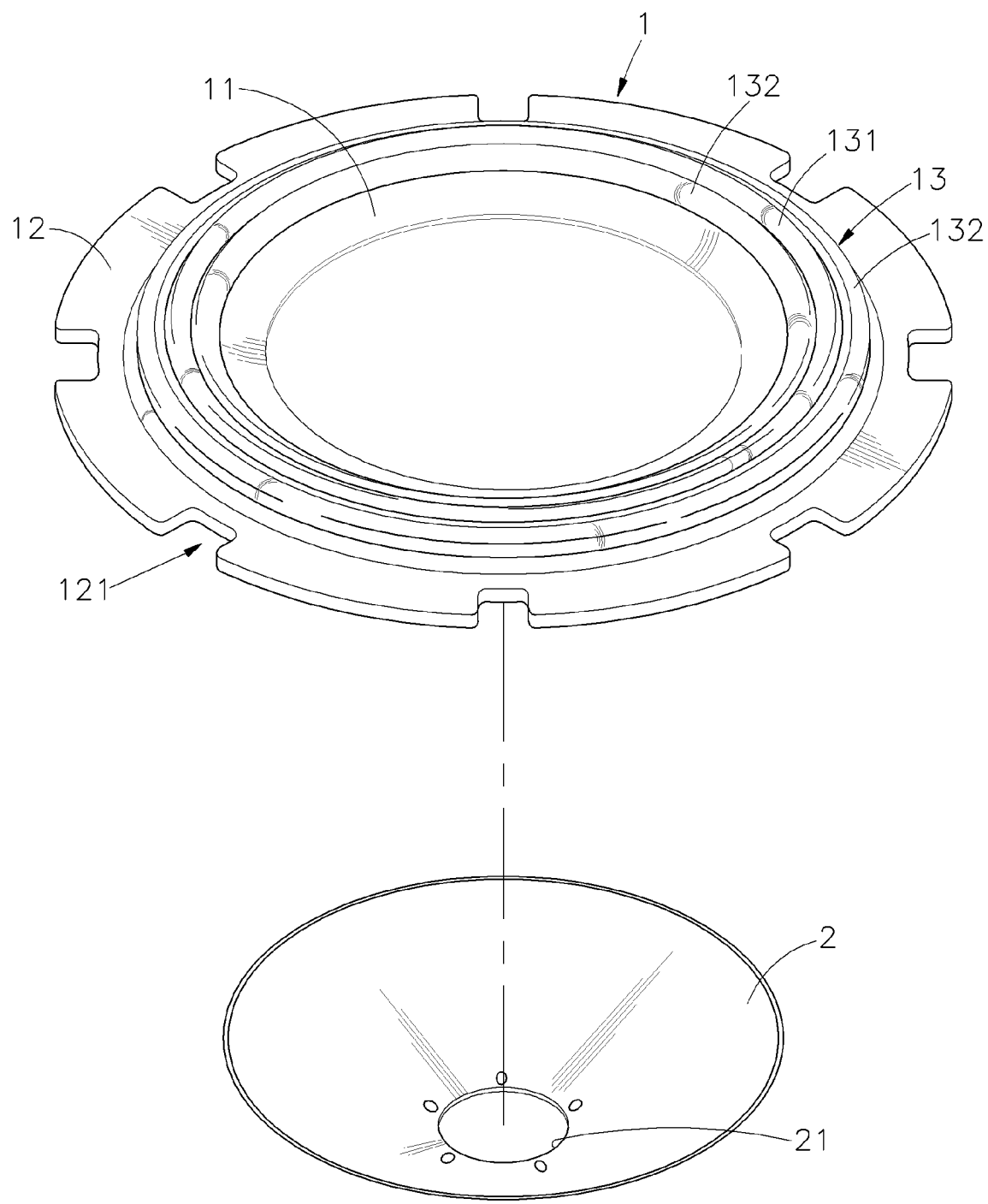
FIG. 1 is an exploded view of a suspension member and a cone for speaker according to the present invention.
Figure 2A:
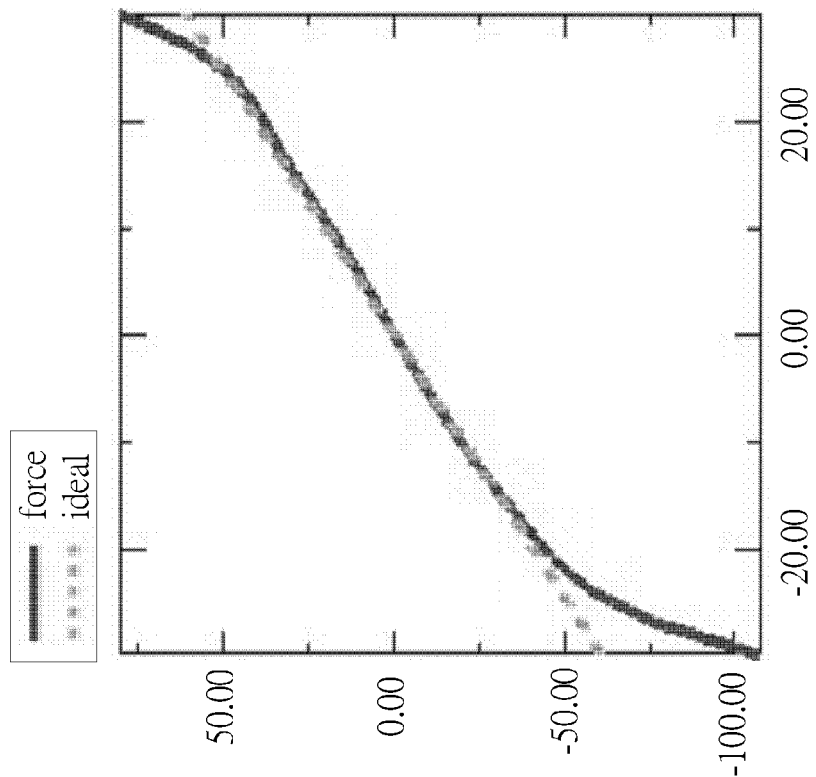
FIG. 2A is a vibration waveform obtained from the suspension member according to the present invention.
Figure 2:
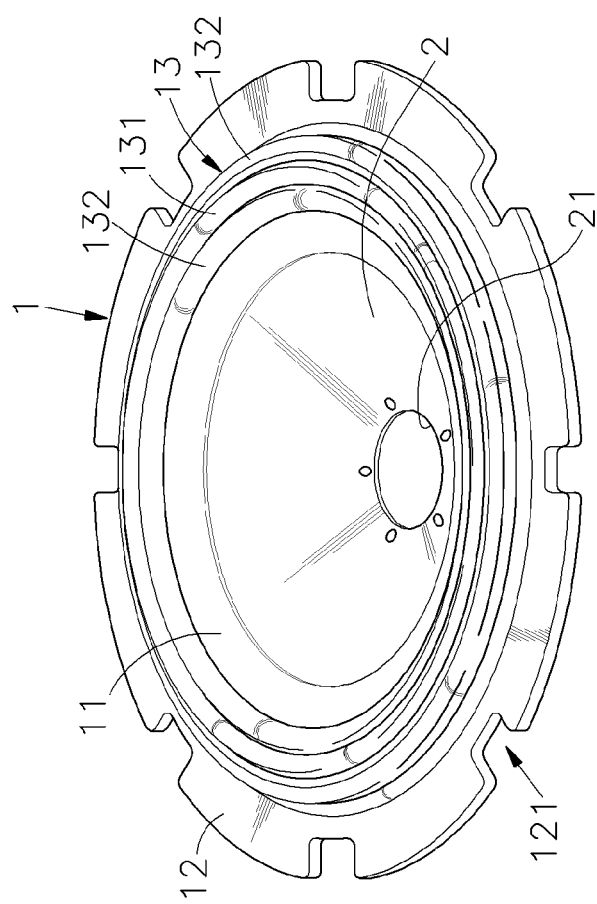
FIG. 2 is an elevational view of the present invention, showing the cone bonded to the suspension member.

Referring to FIGS. 1 and 2, a suspension member 1 in accordance with the present invention is a hollow elastic member, having an inner diameter portion 11 bonded to the peripheral edge of a cone 2 that has a center opening 21, an outer diameter portion 12 extending around the inner diameter portion 11, a plurality of peripheral locating notches 121 equiangularly formed in the outer diameter portion 12, and at least three annular convex surface portions 13 that are smoothly arched in transverse direction and arranged one within another around the inner diameter portion 11 and connected between the inner diameter portion 11 and the outer diameter portion 12. The at least three annular convex surface portions 13 include a middle annular convex surface portion, i.e., the summit 131 and a plurality of lateral annular convex surface portions, i.e., the summit ridges 132 symmetrically disposed at two opposite sides relative to the summit (middle annular convex surface portion) 131. The summit ridges (lateral annular convex surface portions) 132 are respectively disposed at an elevation above the elevation of the inner diameter portion 11 and the outer diameter portion 12 and below the elevation of the summit (middle annular convex surface portion) 131. Thus, the structure of the inner diameter portion 11, the outer diameter portion 12 and at least three annular convex surface portions 13 show a substantially Ω-like cross section. The combined width of the annular convex surface portions 13, i.e., the pitch between the inner diameter portion 11 and the outer diameter portion 12 is predetermined subject to the design of the speaker.

Figure 3:
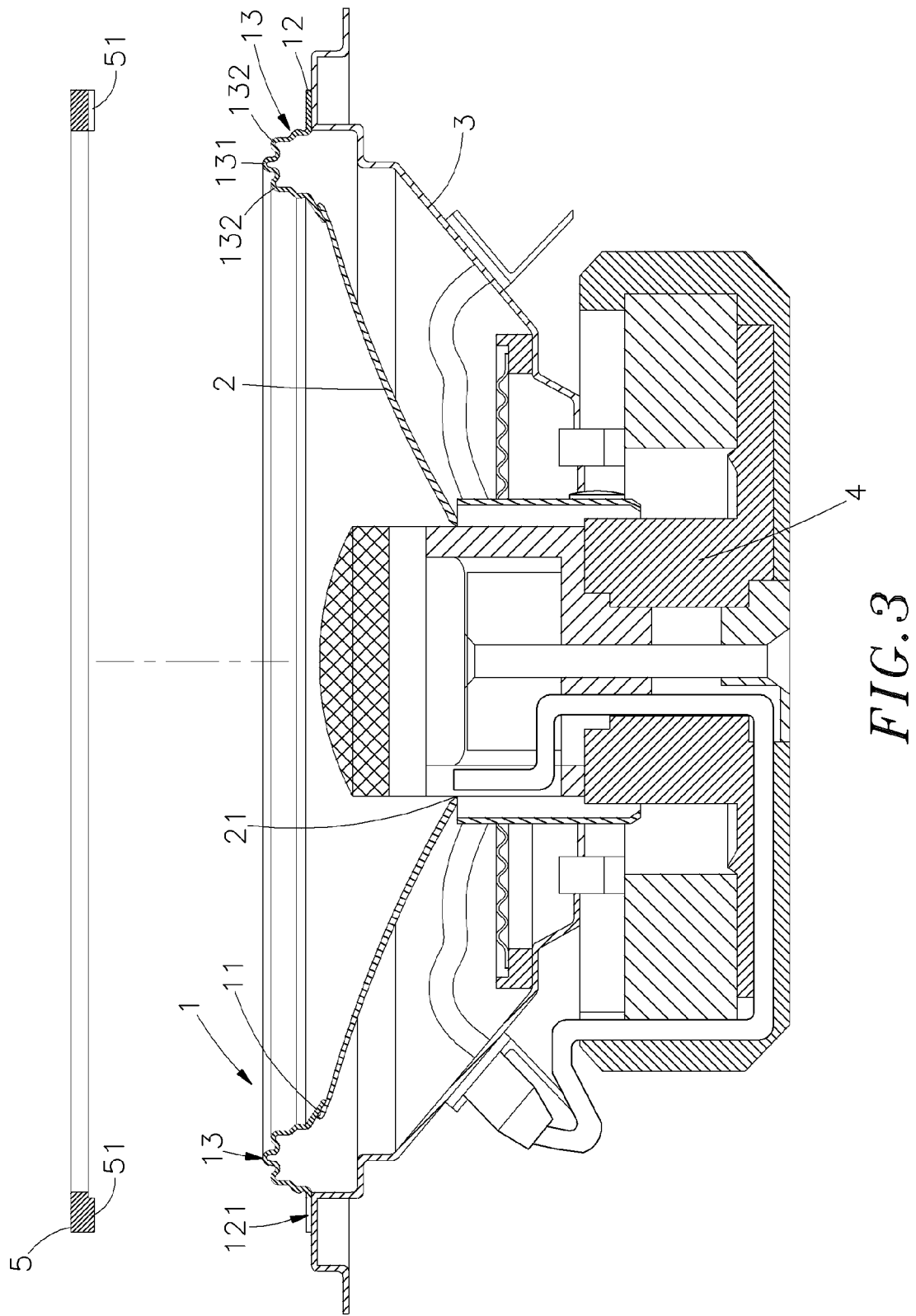
FIG. 3 is a sectional view showing the installation of the suspension member with the cone in a speaker according to the present invention (I).
Figure 4:
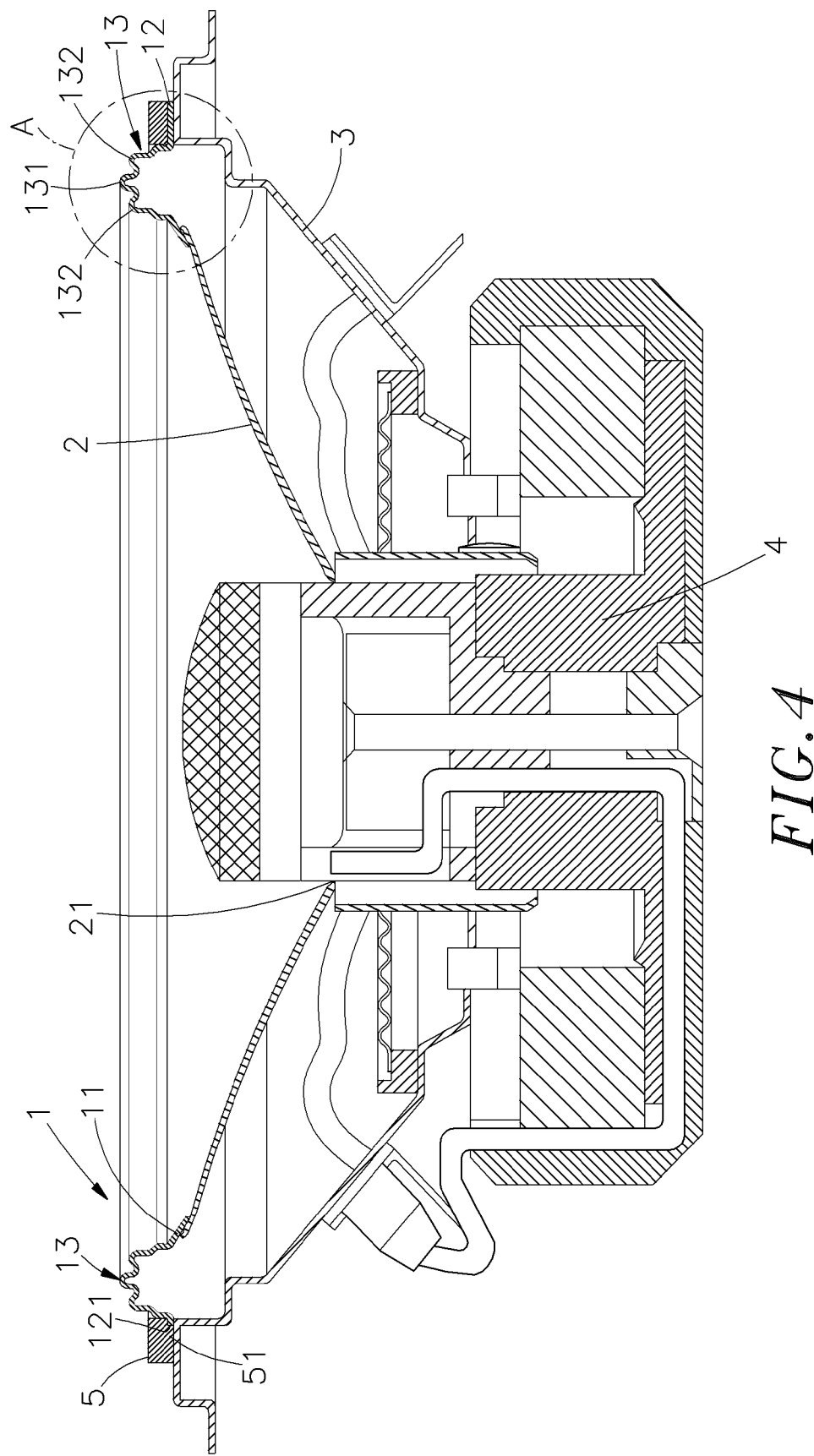
FIG. 4 is a sectional view showing the installation of the suspension member with the cone in a speaker according to the present invention (II).
Figure 5:
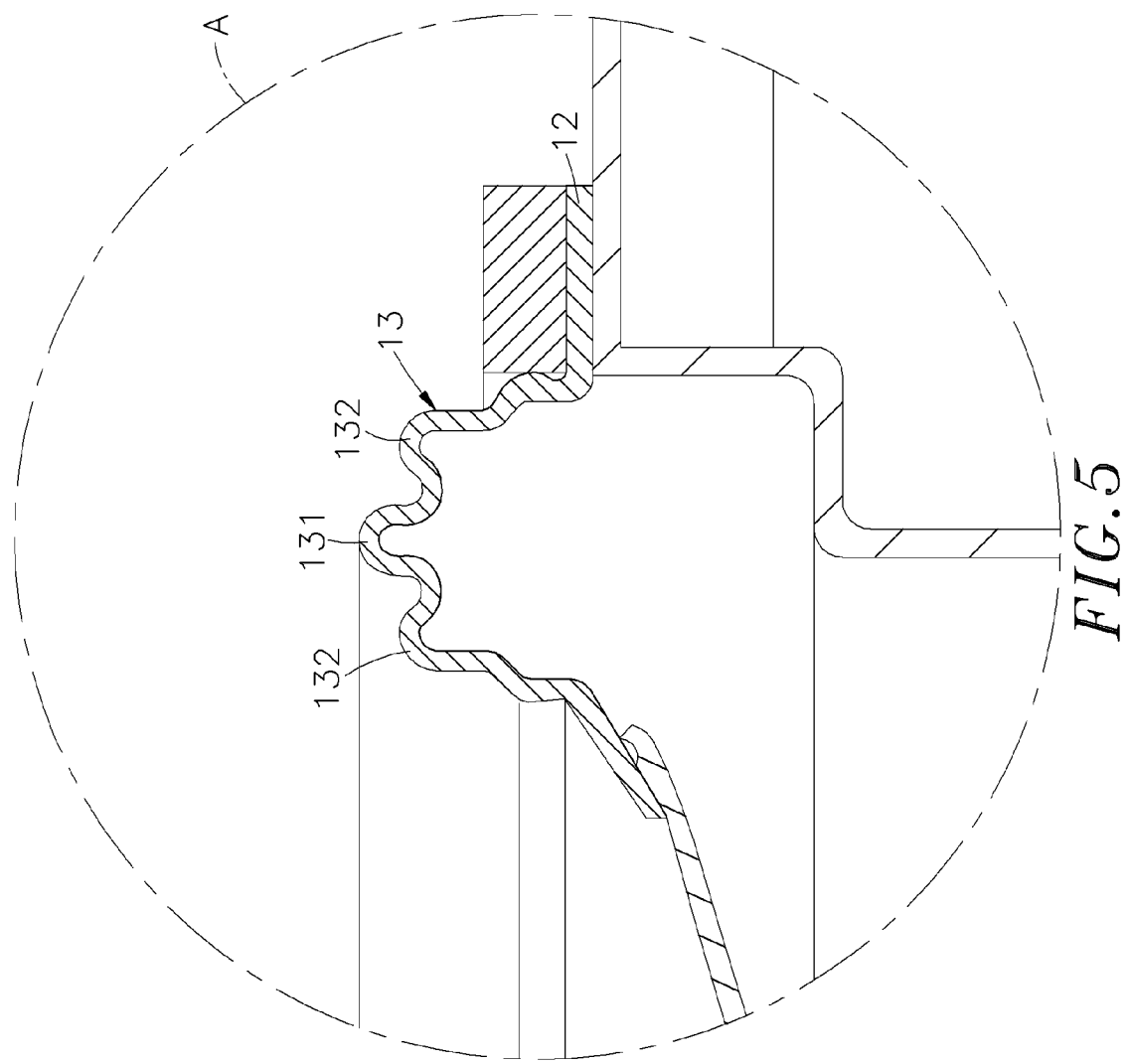
FIG. 5 is an enlarged view of part A of FIG. 4.
Figure 7A:
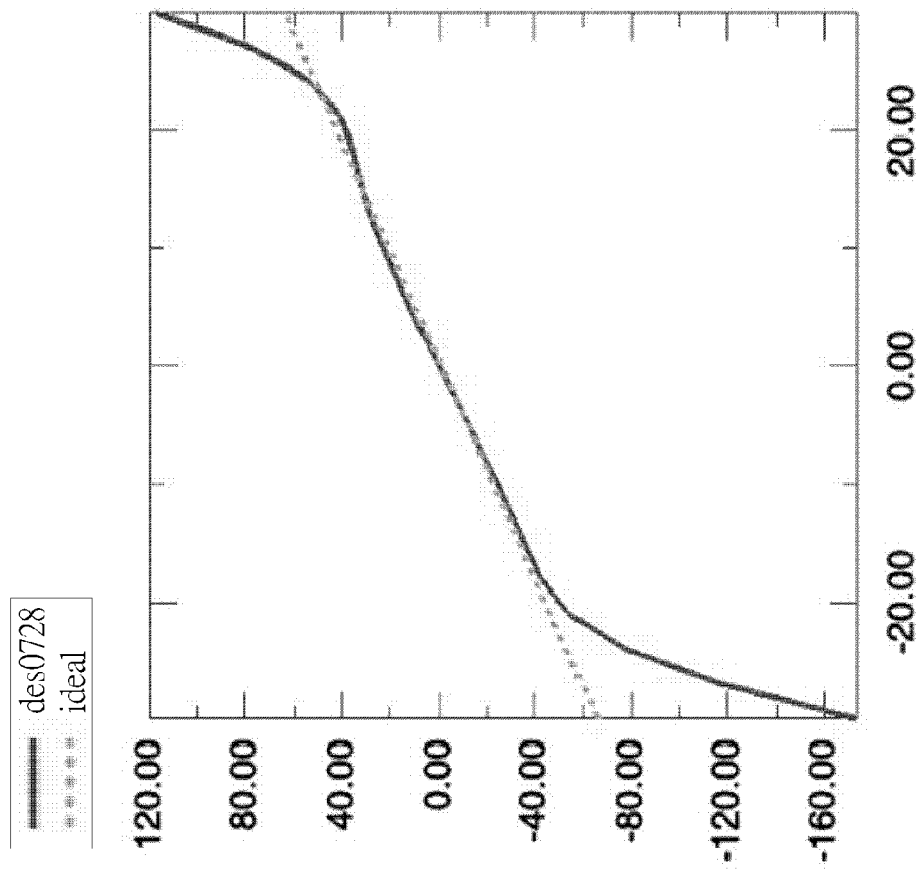
FIG. 7A is a vibration waveform obtained from the suspension member according to the prior art
Figure 7:
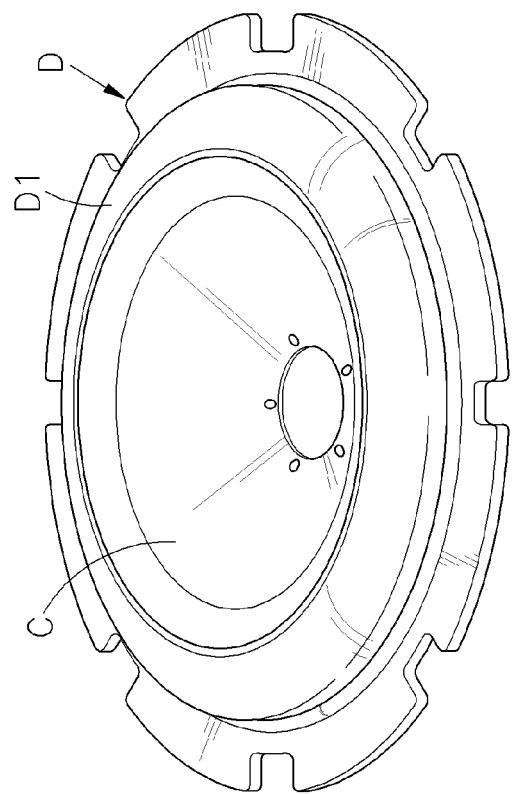
FIG. 7 is an elevational assembly view of a suspension member and a cone according to the prior art.
Figure 8:
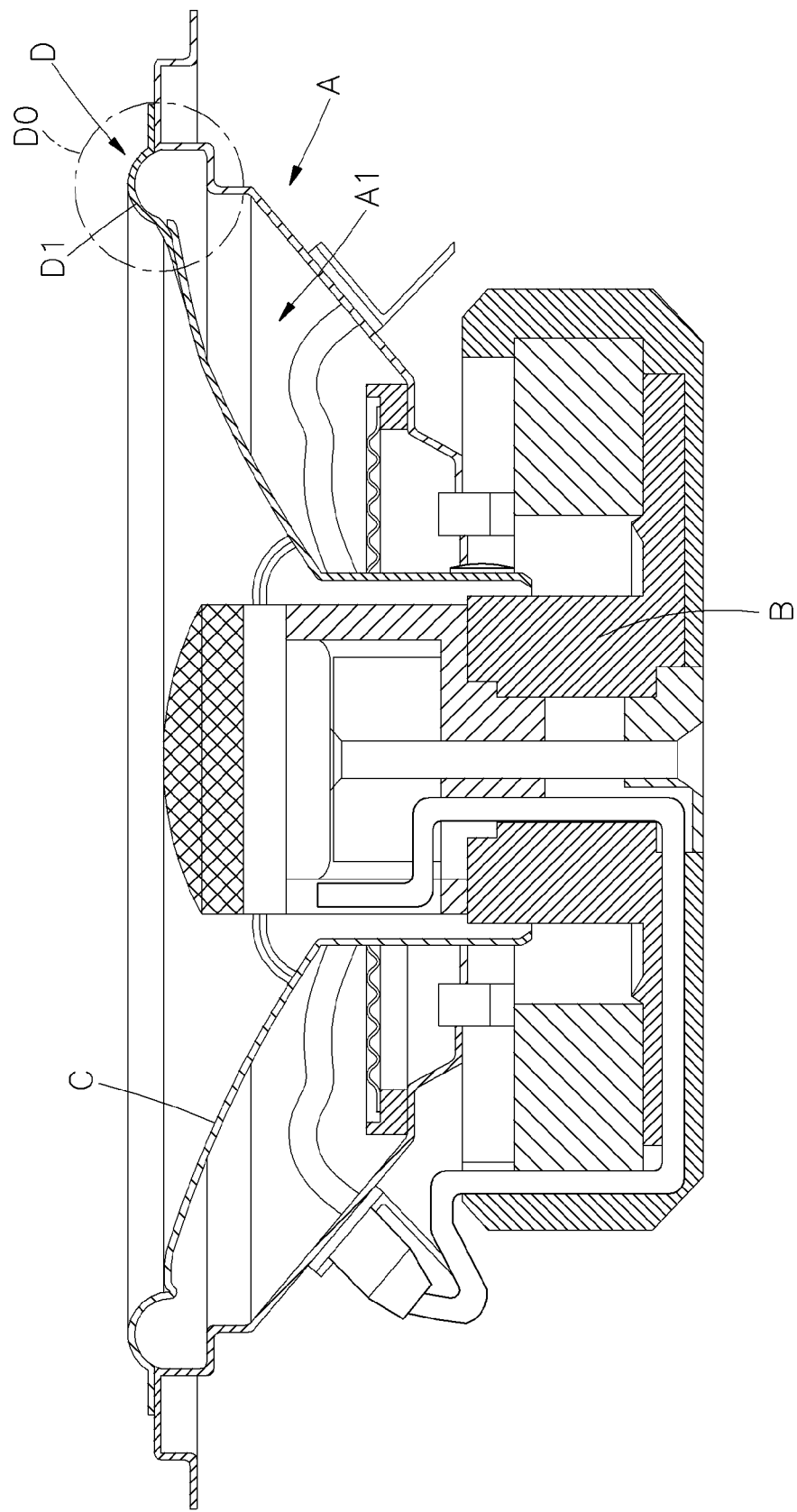
FIG. 8 is a schematic sectional view of a speaker constructed according to the prior art.
Figure 8A:
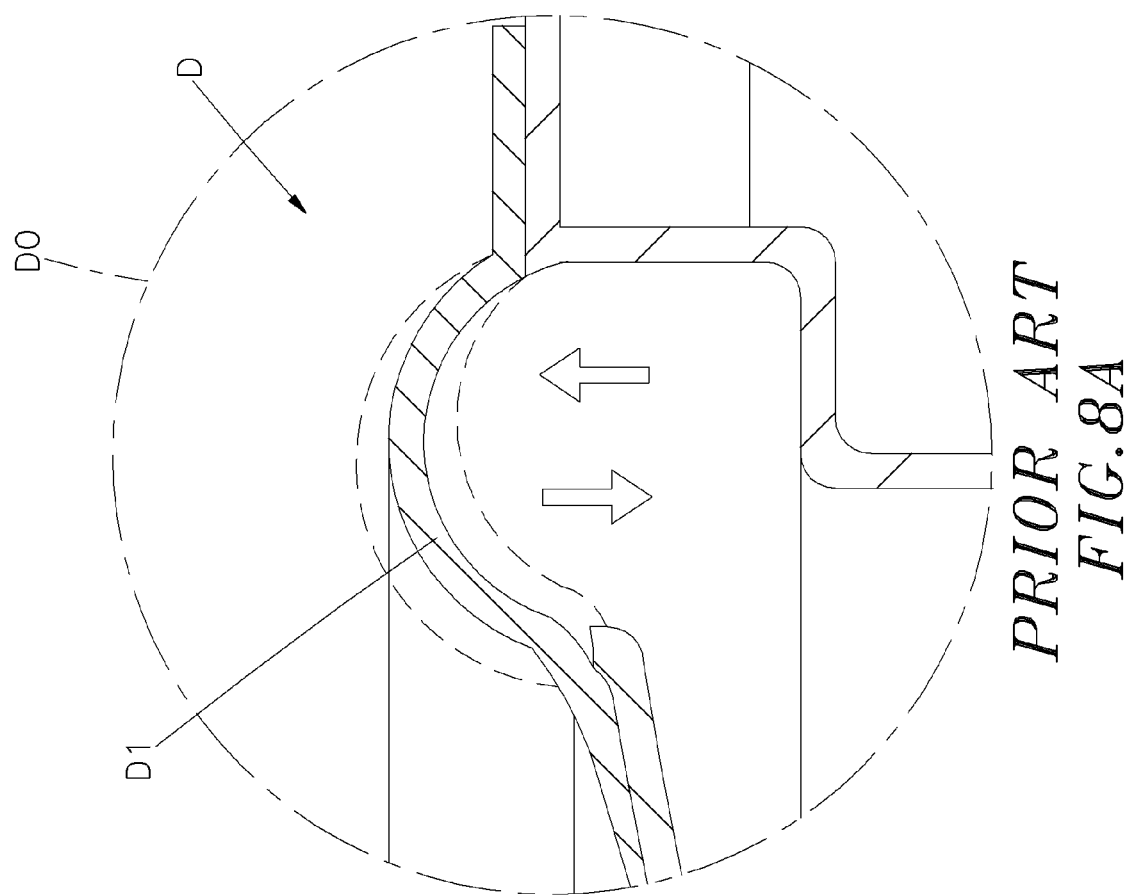
FIG. 8A is an enlarged view of part D0 of FIG. 8.

Referring to FIGS. 3 and 4 and FIG. 2 again, the suspension member 1 is put with the cone 2 in a basket 3 for enabling an exciter 4 to pass through the center opening 21 of the cone 2 and the outer diameter portion 12 of the suspension member 1 to be attached to the surface of the basket 3. Thereafter, a locating ring 5 is attached to the outer diameter portion 12 of the suspension member 1 to force bottom flanges 51 of the locating ring 5 into engagement with the locating notches 121 of the outer diameter portion 12 of the suspension member 1. Thus, the installation of the suspension member 1 in the basket 3 is done.

Referring to FIGS. 2A, 5, 6A and 6B and FIG. 4 again, during the operations of the exciter 4, the cone 2 is continuously moved up and down to produce sound, and the maximum amount of displacement of the cone 2 is the stroke of the speaker. Under this configuration, the elastically deformable material property of the suspension member 1 establishes a sufficient support to the cone 2. Because the pitch between the inner diameter portion 11 and the outer diameter portion 12 is constant and because there are at least three annular convex surface portions 13 connected between the inner diameter portion 11 and the outer diameter portion 12, the suspension member 1 is freely deformable to compensate the oscillation motion of the cone 2 during the operations of the exciter 4 while giving a sufficient support to the cone 2, thereby maintaining the voice curve of the cone 2 in a nearly-linear status (see FIG. 2A). Therefore, the suspension member 1 establishes sufficient support to the cone 2, while avoiding any distortion.

Further, the number of the annular convex surface portions 13 can be changed subject to the requirements of the speaker (for example, width of sound range, range of output power, etc.) so that the speaker can provide a comparatively better sound quality. When changing the number of the annular convex surface portions 13, the curvature and arrangement of the annular convex surface portions 13 can be relatively changed, maintaining the same combined width to fit the cone 2.

Further, the suspension member 1 is made of an elastic material, for example, polyurethane.

As indicated above, the present invention provides a suspension member for speaker, which has multiple annular convex surface portions connected between an inner diameter portion and an outer diameter portion thereof and surrounding one within another around the inner diameter portion to provide a strong support to the cone, thereby preventing distortion of sounds. The suspension member shows substantially an Ω-like cross section. The number of the annular convex surface portions may be changed. However, when changing the number of the annular convex surface portions, the pitch between the inner diameter portion and the outer diameter portion remains unchanged to fit the cone. Therefore, the suspension member can be made in different forms having different designs of annular convex surface portions between the inner diameter portion and the outer diameter portion without changing the width between the inner diameter portion and the outer diameter portion to fit to the same specification of cone for different speaker applications.

A prototype of suspension member for speaker has been constructed with the features of FIGS. 1~6. The suspension member for speaker functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A suspension member being elastically deformable for use in a speaker, said suspension member comprising:
    an inner diameter portion for the mounting of a cone,
    an outer diameter portion spaced around said inner diameter portion at a predetermined distance for fastening to a basket,
    a first annular convex surface portion radially connected between said inner diameter portion and said outer diameter portion and extending around said inner diameter portion and constituting a summit, and
    a plurality of second annular convex surface portions, wherein the plurality of second annular convex surface portions are symmetrically arranged relative to said first annular convex surface portion, one of the second annular convex surface portions being arranged between the inner diameter portion and the first annular convex surface portion and concentrically surrounding said inner diameter portion, and the other of the second annular convex surface portions being arranged between the first annular convex surface portion and the outer diameter portion and concentrically surrounding the first annular convex surface portion, and wherein the one and the other second annular convex surface portions constitute summit ridges which comprise a height below said summit and above the elevations of said inner diameter portion and said outer diameter portion.

\* \* \* \* \*